United States Patent
Okada et al.

(10) Patent No.: US 6,615,571 B1
(45) Date of Patent: Sep. 9, 2003

(54) APPARATUS AND METHOD FOR ASSEMBLING OPTICAL CABLE

(75) Inventors: Takehiko Okada, Kanagawa (JP); Shigeru Suemori, Kanagawa (JP); Masakazu Watanabe, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/541,627

(22) Filed: Apr. 3, 2000

(30) Foreign Application Priority Data

Apr. 7, 1999 (JP) .......................................... 11-099539

(51) Int. Cl.[7] ................................................ D02G 3/36
(52) U.S. Cl. ...................................... 57/6; 57/11; 57/13
(58) Field of Search ............................ 29/429; 57/6, 9, 57/11, 13

(56) References Cited

U.S. PATENT DOCUMENTS

| | | | | |
|---|---|---|---|---|
| 3,881,340 A | * | 5/1975 | Hay | |
| 4,156,624 A | * | 5/1979 | de Vecchis et al. | |
| 4,266,398 A | * | 5/1981 | Vogelsberg | 57/6 |
| 4,395,869 A | * | 8/1983 | Priaroggia et al. | |
| 4,446,686 A | * | 5/1984 | Panuska et al. | |
| 4,619,107 A | * | 10/1986 | Missout et al. | 57/6 |
| 4,757,675 A | * | 7/1988 | Oglesby et al. | 57/6 |
| 4,796,414 A | * | 1/1989 | Bruggmann et al. | 57/9 |
| 4,825,629 A | * | 5/1989 | Missout et al. | 57/6 |
| 5,315,813 A | * | 5/1994 | Ito et al. | 57/6 |
| 6,000,209 A | * | 12/1999 | Ito et al. | |

FOREIGN PATENT DOCUMENTS

| | | |
|---|---|---|
| EP | 0 521 503 A1 | 7/1992 |
| EP | 0 849 616 A1 | 12/1997 |
| JP | 08173029 | 7/1993 |
| JP | 10268170 | 10/1998 |

* cited by examiner

Primary Examiner—Douglas Olms
Assistant Examiner—Steven Blount
(74) Attorney, Agent, or Firm—McDermott, Will & Emery

(57) ABSTRACT

An apparatus for assembling an optical cable comprises a spacer paying-out portion 7, a stationary ribbon supply unit 9, a gathering portion 14 and a taking-up portion 21. The spacer paying-out portion 7 supplies a spacer 2 having a spiral groove in the surface of a long spacer body from a supply reel 1 while revolving around a line axis X-X. The stationary ribbon supply unit 9 supplies a plurality of optical fiber ribbons 11. The gathering portion 14 forms the optical fiber ribbons 11 sent out of the stationary ribbon supply unit 9 into a cable core 15 by holding the optical fiber ribbons 11 within the spiral groove of the spacer 2 sent out of the spacer paying-out portion 7 and running forward while rotating on its center axis. The taking-up portion 21 winds the cable core 15 on a taking-up reel 20 while revolving around the line axis. A winding roller 8 (8') having an rotational direction identical to an rotational direction of the supply reel 1 of the spacer 2 and used for winding the spacer 2 or the cable core 15 is installed adjacently before and after the gathering portion whereby to revolve the winding roller around the line axis in synchronization with the revolution of the spacer paying-out portion 7. Accordingly, it is possible to prevent a twisting of the spacer in the gathering portion resulting from a winding habit of the spacer during a step of assembling cables.

4 Claims, 10 Drawing Sheets

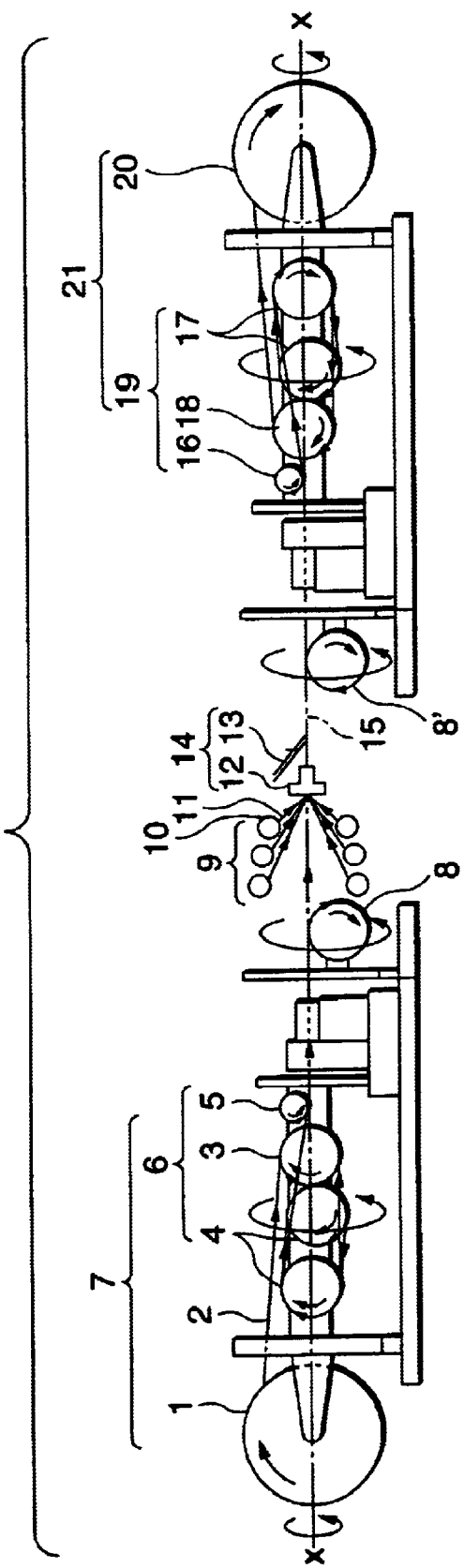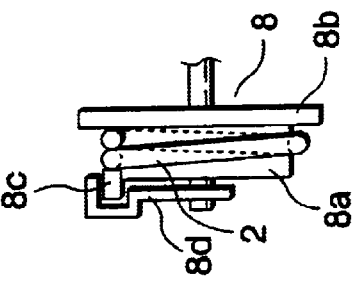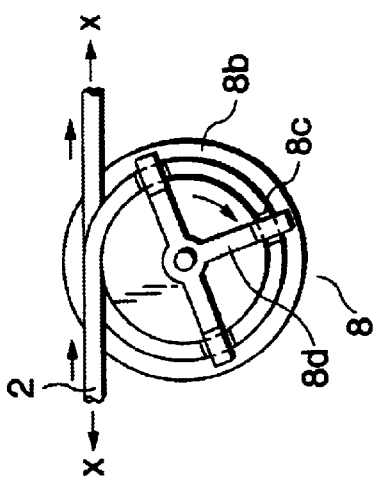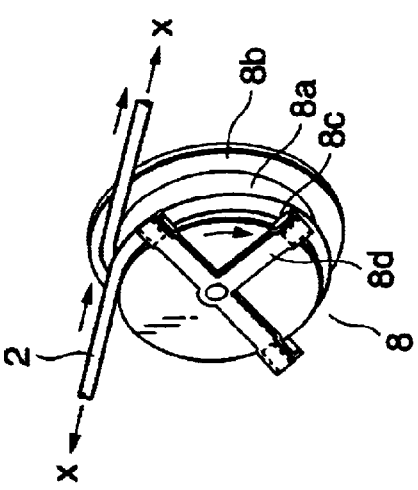

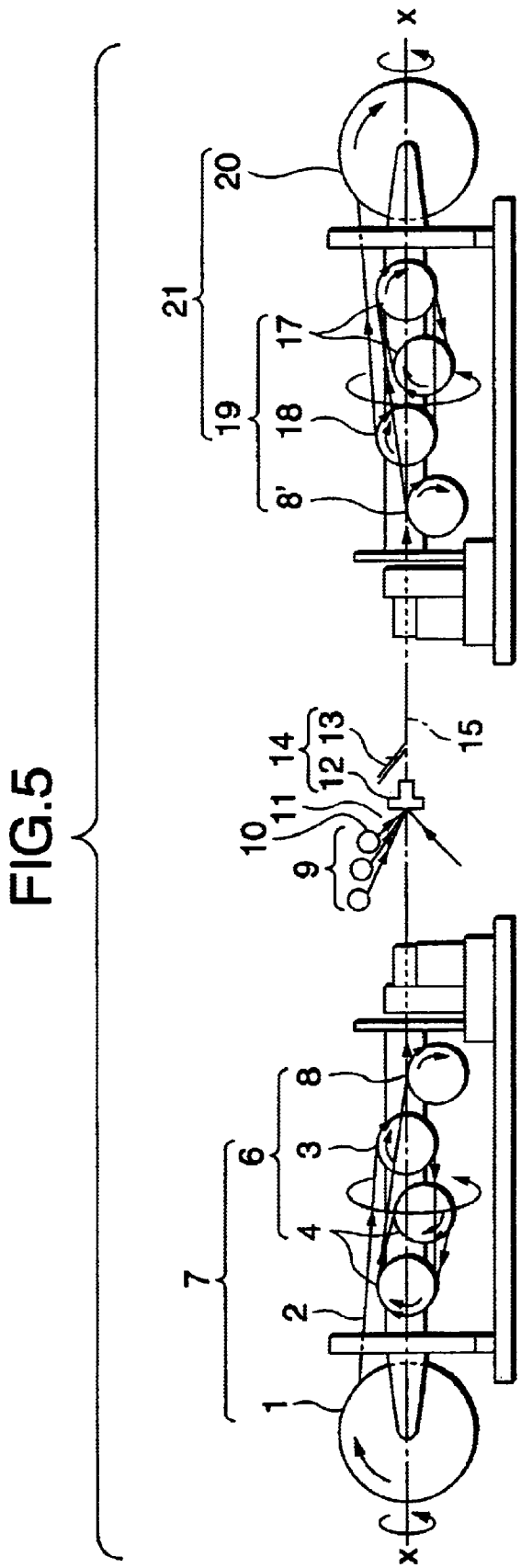

APPARATUS AND METHOD FOR ASSEMBLING OPTICAL CABLE

BACKGROUND OF THE INVENTION

The present invention relates to an apparatus and a method for assembling an optical cable. In the optical cable, a grooved spacer has an elongated plastic rod with a plurality of spiral grooves in its circumferential surface and optical fiber ribbons are held within the respective spiral grooves of the spacer.

Optical cables, in which a grooved spacer has an elongated plastic rod with a plurality of spiral grooves in its circumferential surface and optical fiber ribbons are held within the respective spiral grooves, are now widely employed as a representative example of the optical cable shown in FIG. 9.

FIG. 9(A) is a perspective view of a spacer, FIG. 9(B) is a transverse sectional view of an optical fiber ribbon, and FIG. 9(C) is a transverse sectional view of an optical cable.

As shown in FIG. 9, an optical cable comprises a spacer 30, an anti-tension element 31, a plastic molded element 32, a plurality of spiral grooves 33, optical fiber ribbons 34, wires 34a, a wire covering 34b, an upper winding tape 35, a cable core 36, and an outer covering 37.

In this optical cable, the spacer 30 is formed from the plastic molded element 32 and the anti-tension element 31.

The anti-tension element 31 is formed of a steel wire, a twisted wire, FRP or the like. The plastic molded element 32 is made of polyethylene or the like, and has a single or a plurality of spiral grooves 33 in the periphery of the anti-tension element 31. In this case, the outer diameter of the spacer ranges from about 5 mm to 30 mm. A plurality of wires 34a is formed by covering glass fiber of quartz or the like with ultraviolet curing resin or the like. The optical fiber ribbons 34 are formed by disposing the plurality of wires 34a in parallel and then covering all the wires 34a with the wire covering 34b made of ultraviolet curing or the like.

The optical fiber ribbons 34 are laminated and held within the spiral groove 33 of the spacer 30, and the upper winding tape 35 is applied to the outer periphery of the plastic molded element 32 to make the cable core 36. Then the plastic or metal outer covering 37 is applied to the perimeter of the cable core 36 to complete the optical cable. Although there has been shown an exemplary optical cable in which the laminated optical fiber ribbons 34 are respectively held within the spiral grooves 33 of the spacer 30 in FIG. 9, a single optical fiber ribbon having one wire 34a may be used. Further, the optical fiber ribbons held within the spiral grooves 33 may be formed by twisting a plurality of single wires and then press-winding the single wires. Moreover, the spiral direction of the spiral groove of the spacer may be set to the opposite direction to that shown in FIG. 9(A).

In the case of such the optical cable as mentioned above, a step of holding the optical fiber ribbons within the spiral grooves of the spacer to manufacture cable cores is called a cable assembly step. The cable assembly step is carried out by an optical cable assembly apparatus. FIG. 10 is an elevational view of a main part of an optical cable assembly apparatus. The optical cable assembly apparatus comprises a supply reel 41, supplying a spacer 42, a dancer roller 43, brake rollers 44, a guide roller 45, a brake mechanism 46, a spacer paying-out portion 47, a stationary ribbon supply unit 48, supply reels 49 supplying optical fiber ribbons 50, a gathering die 51, a gathering portion 53 winding an upper winding tape 52 onto the spacer 42 to make a cable core 54, a guide roller 55, capstan rollers 56, a dancer roller 57, a take-up mechanism 58, a taking-up reel 59, and a taking-up portion 60. In FIG. 10, X-X is a line axis around which the spacer paying-out portion 47 and the taking-up portion 60 revolve.

A main part of the optical cable assembly apparatus includes the spacer paying-out portion 47, the stationary ribbon supply unit 48, the gathering portion 53 and the taking-up portion 60. The spacer paying-out portion 47 comprises the supply reel 41 and the brake mechanism 46. The supply reel 41 revolves around the line axis X-X in the direction of the spiral groove of the spacer 42. The number of revolutions thereof is in synchronization with the number of rotations of the spiral groove thereof. The brake mechanism 46 comprises the dancer roller 43, the brake rollers 44 and the guide roller 45. The brake mechanism 46 is used to apply back tension to the spacer 42 sent out of the supply reel 41. That is, the spacer 42 sent out of the supply reel 41 is wound on the brake rollers 44 via the dancer roller 43, so that the back tension is applied to the spacer 42. The diameters of the dancer roller 43 and the brake roller 44 ranges from 600 to 800 mm, and the diameter of the guide roller 45 ranges from about 100 to 600 mm.

The spacer 42 applied back tension is sent out of the spacer paying-out portion 47 via the guide roller 45 toward the gathering portion 53. The difference between speed in extending the spacer 42 from the supply reel 41 and speed in transferring the spacer 42 on the brake roller 44 is temporarily adjusted by displacing the position of the dancer roller 43. The guide roller 45 is used to make a direction of letting out the spacer 42 from the brake rollers 44 coincide with the direction of the line axis X-X.

The spacer 42 sent out of the spacer paying-out portion 47 runs forward along the line axis X-X while rotating on its center axis. However, as the rotation on its center axis coincides with the rotation of the spiral groove, the spiral groove spatially appears stationary even though it runs forward. Accordingly, the spiral groove of the spacer 42 always stays at the same position in the circumferential direction.

On the other hand, the optical fiber ribbons 50 are sent out of a plurality of supply reels 49 and then guided to the spiral groove of the spacer 42. The plurality of supply reels 49 are installed in the stationary ribbon supply unit 48 fixed to the ground. The optical fiber ribbons 50 and the spacer 42 are gathered at the gathering die 51, and then the upper winding tape 52 is wound thereon in the gathering portion 53. Since the spiral groove of the spacer 42 stays at the same position in the circumferential direction at the place of the gathering die 51 of the gathering portion 53, the optical fiber ribbons 50 can be held within the spiral groove by only guiding the optical fiber ribbons 50 to the same position. Next, the upper winding tape 52 is wound on the spacer 42 in the gathering portion 53 after the optical fiber ribbons 50 are held within the spiral groove, so that the cable core 54 is completed. In this case, it may be arranged to hold the spacer 42 with a coarse winding element or the like instead of winding the spacer 42 with the upper winding tape 52.

The cable core 54 completed in the gathering portion 53 runs forward to the taking-up portion 60. The taking-up portion 60 comprises the take-up mechanism 58 and the taking-up reel 59, and revolves around the line axis X-X in synchronization with the revolution of the spacer paying-out portion 47. The take-up mechanism 58 is used to add a take-up force to the cable core 54. The take-up mechanism 58 comprises the guide roller 55, the capstan rollers 56 and the dancer roller 57. The cable core 54 that has entered the take-up mechanism 58 of the taking-up portion 60 along the line axis X-X is wound on the capstan rollers 56 via the guide roller 55.

Then the cable core 54 is wound on the taking-up reel 59 via the dancer roller 57. In this case, the guide roller 55 is used to guide the cable core 54 to the capstan rollers 56. The capstan rollers 56 is used to add the take-up force to the cable core 54. The dancer roller 57 is used to temporarily adjust the difference between speed in taking up the cable core 54 on the capstan rollers 56 and speed in winding the cable core 54 on the taking-up reel 59.

Since the spacer is the plastic molded element having the high rigid anti-tension element in its central part and quite a thick rod body having a diameter of 5 mm–30 mm, it has substantially great bending rigidity. Consequently, the spacer wound on the supply reel has an extremely strong winding habit. When it is attempted to bend a longitudinally part of the spacer in a direction opposite to a winding direction of the spacer wound on the supply reel, a bending force is generated which is directed in a direction against the winding habit, and then rotational force on the center axis is caused to that part of the spacer thereby. Accordingly, the spacer rotates on the center axis, and then twisting is generated thereto.

As the twisting of the spacer is generated between the roller used to give bending in the opposite direction to the winding direction and another roller in front of or behind it, the spacer between them undergoes variation in the spiral pitch of the spiral groove. Further, the cable core also has a strong winding habit because the optical fiber ribbons, which is held within the spiral groove of the spacer to make the cable core, have substantially no effect on the bending rigidity of the spacer. Accordingly, the twisting is generated to the cable core as in the case when the spacer is bent in the direction against the winding habit of the cable core.

On the other hand, the dancer roller 43 and the brake roller 44 in the spacer paying-out portion 47, and the capstan rollers 56, the dancer roller 57 and the taking-up reel 59 in the taking-up portion 60, as shown in the elevational view of FIG. 10, are rotated clockwise like the supply reel 41 in order to extend and wind the spacer 42 or to take up and wind the cable core 54. On the contrary, the guide roller 45 in the spacer paying-out portion 47 and the guide roller 55 in the taking-up portion 60 are rotated counterclockwise in order to guide the spacer 42 or the cable core 54 thereto.

As a result, the spacer 42 in the portions of the guide rollers 45 and 55 is subjected to bending in the direction against the winding habit and the twisting on the center axis is caused to the spacer 42 or the cable core 54 by the opposite rotations of the guide rollers 45 and 55. As this twisting of the spacer 42 or the cable core 54 substantially affects the gathering portion 53, the spiral pitch of the spiral groove of the spacer 42 or the cable core 54 in front of and behind the gathering portion 53 deviates from a normal value, that is, becomes greater or smaller than the normal value. Accordingly, when the optical fiber ribbons are held within the spiral groove of the spacer, the optical fiber ribbons are to be held in such a state that the spiral pitch of the spacer has deviated from the normal value.

As the optical fiber ribbons and the spacer are gathered in such a state that they have been given an allowance for predetermined expansion and contraction according to a design thereof, a predetermined back tension is applied to them at a point of time they pass through the gathering portion. This back tension is released at the time the cable core has been wound on the taking-up reel. In this case, the back tension is determined so that the optical fiber ribbons may be held within the spiral groove in a manner that they give an allowance for predetermined expansion and contraction with respect to the spacer.

The optical fiber ribbons held within the spiral groove of the spacer have the stranding ratio which obtained from the distance between the position of the optical fiber ribbons and the center axis of the spacer, and the spiral pitch. The optical fiber ribbons are set longer than the spacer by a length equivalent to the stranding ratio. Accordingly, if the spiral pitch of the spiral groove varies, the length of the optical fiber ribbons held in the spiral groove also varies.

If the spacer passes through the gathering portion with the spiral pitch fluctuated due to the twisting and then the optical fiber ribbons are held within the spiral groove, the length of the optical fiber ribbons held therein deviates from the normal value by the length equivalent to the fluctuation of the spiral pitch. Further, if the cable core is wound on the taking-up reel in the state above-mentioned and then the spiral pitch is returned to the original state since the cable core is released from the twisting at the taking-up portion, the deviation of the expansion and contraction of the optical fiber ribbons from the normal value becomes apparent due to fluctuations in the length of the optical fiber ribbons. If the expansion and contraction of the optical fiber ribbons greatly deviate from the normal value, the aging of the optical fiber ribbons will be shortened, the transmission loss of the optical fiber ribbons will be increased, and therefore the quality of the cable cores and the optical cables manufactured therefrom will be deteriorated.

As set forth above, if the spacer or the cable core is passed through the rollers that provide bending in the direction against the winding habit, it undergoes the twisting. Further, if the twisting affects the gathering portion, the quality of optical cables will be deteriorated.

SUMMARY OF THE INVENTION

Accordingly, an object of the present invention is to provide an apparatus and a method for assembling an optical cable, wherein it is possible to prevent the twisting of a spacer or a cable core in a gathering portion which results from the winding habit of the spacer during assembling cables.

The above-mentioned object can be achieved by an apparatus for assembling an optical cable along a line axis comprising:

a spacer paying-out portion, having a supply reel on which a grooved spacer having an elongated plastic rod with a plurality of spiral grooves in its circumferential surface is wound, rotational direction for paying-out the spacer therefrom while revolving around a line axis;

a stationary supply unit for supplying a plurality of optical fiber ribbons to be inserted into respective spiral grooves of the spacer;

a gathering portion for inserting and holding the optical fiber ribbons in the respective spiral grooves of the spacer running forward and rotating on its center axis to form a cable core;

a taking-up portion, having a taking-up reel on which the cable core is, for winding the cable core on the taking-up reel while revolving around the line axis;

a first winding roller rotating in a rotational direction identical to the rotational direction of the supply reel of the spacer, for winding the spacer, the first winding roller being disposed substantially and adjacently before the gathering portion in a spacer conveying direction; and a second winding roller rotating in a rotational direction identical to the rotational direction of the supply reel of the spacer, for winding the cable core, the second winding roller being disposed substantially and adjacently after the gathering portion in the spacer conveying direction, wherein the first and second winding rollers are revolved around the line axis in synchronization with the revolution of the spacer paying-out portion.

In the above-mentioned construction, the first or second winding roller is installed adjacently before and after the gathering portion, that is, installed between the gathering portion and places where the spacer is wound on any one of the first and second rollers in the front of or behind the gathering portion.

It is preferable that the first and second winding rollers are respectively installed in the spacer paying-out portion or the taking-up portion.

It is also preferable that the first or second winding roller may be installed between the spacer paying-out portion or the taking-up portion and the gathering portion. With this installation of the first and second winding rollers, the spacer is not given bending in a direction against the winding habit of the spacer in front of and behind the vicinity of the gathering portion. Accordingly, it is possible to prevent the twisting of the spacer and to stabilize the length of optical fiber ribbons to be held within the spiral groove of the spacer. As a result, it is possible to prevent the transmission characteristics of the optical fiber ribbons from being deteriorated.

Further, provision of the first or second winding roller in the spacer paying-out portion or the taking-up portion makes it possible to use the facilities for revolving the winding roller in common with those for revolving the spacer paying-out portion or the taking-up portion, thus resulting in reducing the facility cost.

Further, In the above-mentioned construction, it is preferable that each of the first and second winding roller comprises a rotary roller with a roller surface on which one of the spacer and the cable core is wound, the rotary roller having a side roller for pushing the one along the roller surface in parallel with an rotational direction of the rotary roller.

It is also preferable that each of the first and second winding rollers comprises a rotary roller with a fleeting ring which is rotatably fitted onto a roller surface of the rotary roller.

The use of the rotary roller with the side roller as the winding roller or the rotary roller with the fleeting roller can suppress centrifugal force resulting from the revolution around the line axis in comparison with the use of the winding roller using the combination of plurality of rollers, and make it possible to reduce the facility cost due to the use of only one rotary. Moreover, the outgoing wire direction can be stabilized by preventing the incoming and outgoing wire directions of the spacer from being same direction on top of each other. Further, provision of the fleeting ring as the winding roller makes it possible to prevent from giving damage to the spacer because the fleeting ring pushes the spacer with the surface thereof. Moreover, the winding roller may comprise more than one roller and wherein the spacer or the cable core is stretched across and wound on the rollers.

The above-mentioned object can be also achieved by an apparatus for assembling an optical cable along a line axis, the apparatus comprising:

a spacer paying-out portion, having a supply reel on which a grooved spacer having an elongated plastic rod with a plurality of spiral grooves in its circumferential surface is wound, for paying-out the spacer therefrom while revolving around a line axis;

a stationary supply unit for supplying a plurality of optical fiber ribbons to be inserted into respective spiral grooves of the spacer;

a gathering portion for inserting and holding the optical fiber ribbons in the respective spiral grooves of the spacer running forward and rotating on its center axis to form a cable core;

a taking-up portion, having a taking-up reel on which the cable core is, for winding the cable core on the taking-up reel while revolving around the line axis;

a first winding roller rotating in a rotational direction identical to the rotational direction of the supply reel of the spacer, for winding the spacer, the first winding roller being disposed in the spacer paying-out portion; and a second winding roller rotating in a rotational direction identical to the rotational direction of the supply reel of the spacer, for winding the cable core, the second winding roller being disposed in the taking-up portion, wherein both the first and second winding rollers are rotated in a rotational direction which is coincided with the rotational direction of the supply reel.

For instance, a dancer roller or a capstan roller can serve as the winding roller without installing the winding roller by changing the outgoing wire position of the dancer roller or the incoming wire position of the capstan roller, so that the facility cost also becomes reducible.

Moreover, the above-mentioned object can be attained by a method for assembling an optical cable along a line axis, the method comprising steps of:

(a) supplying a grooved spacer having an elongated plastic rod with a plurality of spiral grooves on its circumferential surface from a supply reel rotating in a rotational direction while rotating the spacer about its center axis, the supply reel being disposed in a spacer paying-out portion which revolves around the line axis;

(b) supplying optical fiber ribbons from a stationary ribbon supply unit;

(c) winding the spacer on a winding roller rotating in a rotational direction identical to the rotational direction of the supply reel while revolving around the line axis in synchronization with the revolution of the spacer paying-out portion;

(d) guiding the optical fiber ribbons into the spiral grooves respectively and then holding the optical fiber ribbons within the spiral grooves respectively so as to form a cable core in a gathering portion;

(e) winding the cable core on a winding roller rotating in an rotational direction identical to the rotational direction of the supply reel and revolving around the line axis in synchronization with the revolution of the spacer paying-out portion; and (f) winding the cable core on a taking-up reel in a taking-up portion while revolving around the line axis in synchronization with the revolution of the spacer paying-out portion.

In the above-mentioned method, it is advantageous that the method further comprising the steps of:

making a direction of the spacer coincide with the line axis before the step (c); and making a direction of the cable core coincide with the line axis before the step (e).

With this above-mentioned method, the spacer is not given bending in a direction against the winding habit of the spacer in front of and behind the vicinity of the gathering portion. Accordingly, it is possible to prevent the twisting of the spacer and to stabilize the length of optical fiber ribbons to be held within the spiral groove of the spacer. As a result, it is possible to prevent the transmission characteristics of the optical fiber ribbons from being deteriorated.

Other objects, features and advantages of the invention will be evident from the following detailed description of the preferred embodiments described in conjunction with the attached drawings.

BRIEF DESCRIPTION OF THE DRAWINGS

FIG. 1(A) is an elevational view of a main part of an embodiment of an optical cable assembly apparatus according to the present invention, and FIGS. 1 (B), (C) and (D) are a perspective, an elevational and a side view of an example of winding roller for use in the assembly apparatus according to the present invention;

FIG. 5 is an elevational view of a main part of another embodiment of optical cable assembly apparatus according to the present invention;

DETAILED DESCRIPTION OF THE PREFERRED EMBODIMENTS

Figure 2A:
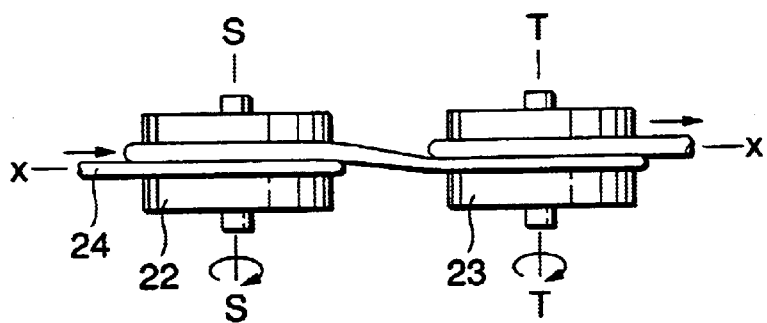
FIGS. 2(A), (B) and (C) are a plan, an elevational and a side view of rollers in a case where the rotational directions of rollers are identical.

Preferred referring to the accompanying drawings, embodiments of the present invention will now be described.

FIG. 1(A) is an elevational view of an embodiment of a main part of an optical cable assembly apparatus of the present invention. FIGS. 1(B), (C) and (D) are a perspective, an elevational and a side view of an embodiment of a winding roller used in the assembly apparatus shown in FIG. 1(A). In FIG. 1, the assembly apparatus comprises a supply reel 1 supplying a spacer 2, a dancer roller 3, brake rollers 4, a guide roller 5, a brake mechanism 6, a spacer paying-out portion 7, winding rollers 8 and 8', a roller surface 8a, a collar 8b, side rollers 8c, roller arms 8d, a stationary ribbon supply unit 9, supply reels 10 supplying optical fiber ribbons 11, a gathering die 12, an upper winding tape 13, a gathering portion 14 winding an upper winding tape 13 onto the spacer 2 to make a cable core 15, a guide roller 16, capstan rollers 17, a dancer roller 18, a take-up mechanism 19, a taking-up reel 20, and a taking-up portion 21. In FIG. 1, X-X is a line axis around which the spacer paying-out portion 7 and the taking-up portion 21 revolve.

Figure 10:
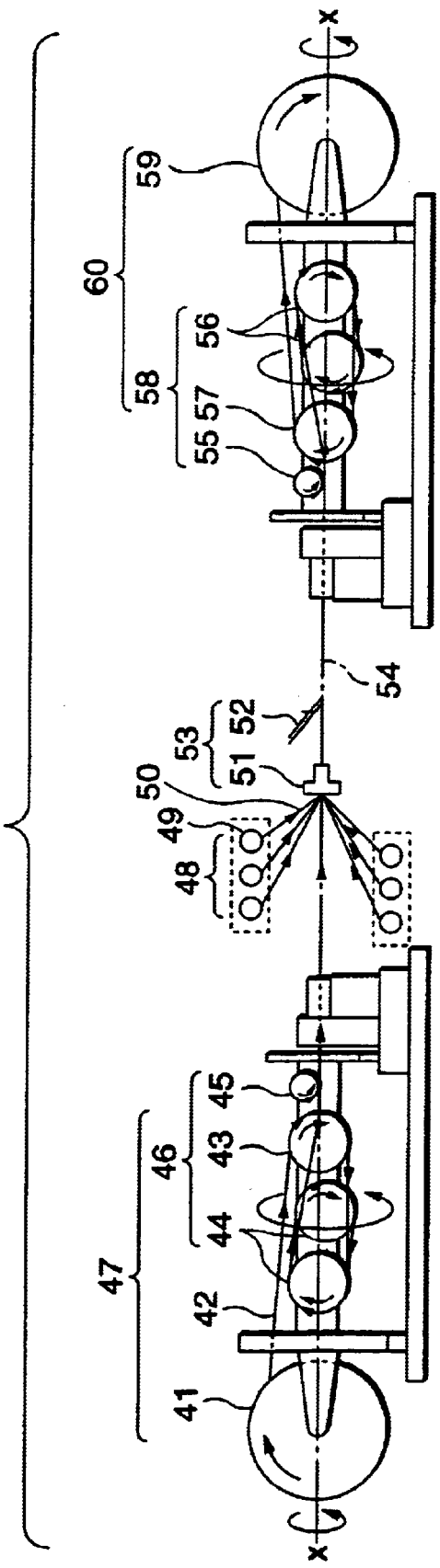
FIG. 10 is an elevational view of a main part of a conventional optical cable assembly apparatus.

A main part of the optical cable assembly apparatus includes the spacer paying-out portion 7, the stationary ribbon supply unit 9, the two winding rollers 8 and 8', the gathering portion 14, and the taking-up portion 21. This optical cable assembly apparatus is similar to optical cable assembly apparatus of the prior art shown in FIG. 10 except the winding rollers 8 and 8'. The spacer paying-out portion 7 comprises the supply reel 1 and the brake mechanism 6. The supply reel 1 revolves around the line axis X-X in a direction of a spiral groove of the spacer 2. The number of revolutions thereof is in synchronization with the number of rotations of the spiral groove thereof. The brake mechanism 6 is used to apply back tension to the spacer 2 sent out of the supply reel 1, and comprises the dancer roller 3, the brake rollers 4 and the guide roller 5.

The spacer 2 sent out of the supply reel 1 is wound on the brake rollers 4 via the dancer roller 3 where the back tension is applied to the spacer 2. Then the spacer 2 is sent out of the spacer paying-out portion 7 via the guide roller 5. The difference between speed in extending the spacer 2 from the supply reel 1 and speed in transferring the spacer 2 on the brake roller 4 is temporarily adjusted by displacing the position of the dancer roller 3. The guide roller 5 is used to change the direction of letting out the spacer 2 from the brake rollers 4 to a direction of the line axis X-X.

The spacer 2 sent out of the spacer paying-out portion 7 is wound on the winding roller 8 more than once. The winding roller 8 is a rotary roller having the side rollers as shown in FIGS. 1(B), (C) and (D). The winding roller 8 has a roller surface 8a, a collar 8b on one side edge of the roller surface 8a, and a side rollers 8c. The side rollers 8c pushes the spacer 2 wound on the roller surface 8a in a direction of a shaft of the rotary roller along the roller surface 8a. A plurality of side rollers 8c are normally disposed in a circumferential direction of the roller surface 8a, the side rollers 8c being supported by a respective roller arms 8d. The structure without the collar 8b provided on the side edge of the roller surface 8a may be possible.

The winding roller 8 is revolved around the line axis X-X in synchronization with and in the same direction of the revolution of the spacer paying-out portion 7 while making incoming and outgoing wire directions of the spacer 2 from the roller surface 8a substantially coincide with the line axis X-X. The diameter of the roller surface 8a of the winding roller 8 ranges from 600 to 800 mm. The spacer wound on the roller surface 8a runs forward so that the winding roller 8 can rotate on the roller axis, and therefore rotational driving force is not applied to the roller shaft.

Although the three roller arms 8d are used to press the respective side rollers 8c against the spacer 2 in FIGS. 1(B), (C) and (D), the number of roller arms 8d and the number of side rollers 8c may be more than three. In the case of this winding roller 8, the incoming and outgoing wire are prevented from overlapping each other on top of the spacer 2 by adjusting the positions of the side rollers 8c. Further, the use of the rotary roller having the side rollers as winding rollers allows the side rollers 8c, to adjust the outgoing direction of the spacer 2, so that the spacer 2 can be sent out to the next gathering portion 14 stably without variation of the outgoing direction.

As shown in FIG. 1(A), the rotational direction of the supply reel 1 of the spacer paying-out portion 7 is set identical to the rotational direction of the winding roller 8. In other words, when the supply reel 1 is rotating clockwise in the elevational view of FIG. 1(A), the spacer 2 is also wound on the winding roller 8 to make the winding roller 8 rotate clockwise. As described above, the winding roller 8 is installed adjacently after the spacer paying-out portion 7. Further, the spacer 2 is wound on the winding roller 8 in a direction in which the spacer 2 has a winding habit, that is in a direction identical to the rotational direction of the supply reel 1. Accordingly, the twisting of the spacer 2 around its center axis can be prevented from influencing the gathering portion 14 though the twisting is generated by bending the spacer 2 in a direction against the winding habit of the spacer 2 with the guide roller 5 of the spacer paying-out portion 7.

The spacer 2 sent out of the winding roller 8 enters the gathering portion 14. The twisting of the spacer 2 on its center axis is removed adjacently after the spacer 2 exits from the winding roller 8. Then the spacer paying-out portion 7 and the winding roller 8 are revolved around the line axis X-X, so that the spacer 2 runs forward while rotating on its center axis with a predetermined rotational cycle. Accordingly, the spacer 2 is not subjected to twisting in the vicinity of the gathering portion 14 and the spiral pitch of the spiral groove provided in its surface does not vary. Consequently, a length of the optical fiber ribbon held within the spiral groove will not change. Accordingly, excellent transmission characteristics are obtainable from a completed optical cable because the length of the optical fiber ribbon relative to the spacer can be stabilized.

The optical fiber ribbons 11 are each sent out of the plurality of supply reels 10 of the stationary ribbon supply unit 9 fixed to the ground, guided to the spiral groove in the surface of the spacer 2 at the gathering die 12 of the gathering portion 14, and then held therein in the same way as that in the prior art. After the optical fiber ribbons 11 are held within the spiral groove of the spacer 2, the upper winding tape 13 is wound thereon to form the cable core 15. In this case, it may be arranged to hold the spacer 2 with a coarse winding element or the like instead of winding the spacer 2 with the upper winding tape 13. However, there may be cases where laminated optical fiber ribbons are held within the spiral groove of the spacer 2, where a single optical fiber ribbon is held therein, and where single optical fiber ribbons are twisted and held therein, and so on.

The cable core 15 completed in the gathering portion 14 is wound on the winding roller 8' installed between the gathering portion 14 and the taking-up portion 21. The winding roller 8' is similar in shape to the winding roller 8 installed between the spacer paying-out portion 7 and the gathering portion 14. This winding roller 8' revolves around the line axis X-X in synchronization with and in the same direction of the revolution of the spacer paying-out portion 7 while making the incoming and outgoing wire directions of the cable core 15 from the roller surface coincide with the line axis X-X.

The winding roller 8' is used to prevent the twisting of the spacer 2 from having an effect on the gathering portion 14 on the basis of bending the spacer 2 in a direction against the winding habit of the spacer 2 developed by the guide roller 16 of the next taking-up portion 21. The twisting generated on the guide roller 16 can be prevented from being transmitted to the spacer 2 in the gathering portion 14 by making the rotational direction of the winding roller 8' also identical to that of the supply reel 1.

The cable core 15 sent out of the winding roller 8' enters the taking-up portion 21. The taking-up portion 21 comprises the take-up mechanism 19 and the taking-up reel 20, and revolves around the line axis X-X in synchronization with the revolution of the spacer paying-out portion 7. The take-up mechanism 19 comprises the guide roller 16, the capstan rollers 17 and the dancer roller 18, and is used to add the take-up force to the cable core 15. The cable core 15 that has entered the take-up mechanism 19 of the taking-up portion 21 along the line axis X-X is wound on the capstan rollers 17 via the guide roller 16, so that the take-up force is added to the cable core 15. Then the cable core 15 is wound on the taking-up reel 20 via the dancer roller 18 while being drawn thereby.

The guide roller 16 is used to change the direction of the cable core 15 that has entered the take-up mechanism 19 along the line axis X-X so as to introduce the cable core 15 to the capstan rollers 17. The dancer roller 18 is used to temporarily adjust the difference between speed in taking up the cable core 15 by the capstan rollers 17 and speed in winding the cable core 15 on the taking-up reel 20.

Setting of the rotational direction of the supply reel identical to that of the winding roller will now be described. In the assembly apparatus shown in FIG. 1(A), as the spacer paying-out portion 7, the winding rollers 8 and 8' and the taking-up portion 21 are made to revolve around the line axis X-X, they appear to be rotating either clockwise or counterclockwise in front. It is therefore impossible to define the winding direction of the reels or rollers only by the clockwise revolution. Accordingly, the winding direction of the reels or rollers is defined by their rotational directions the below.

Figure 2B:
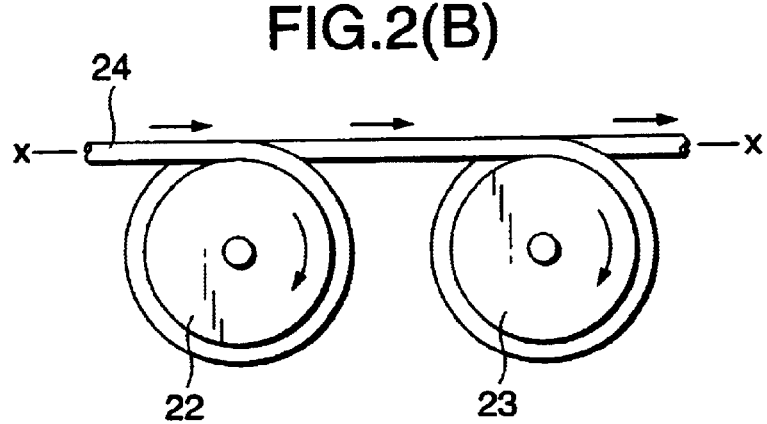
Figure 2C:
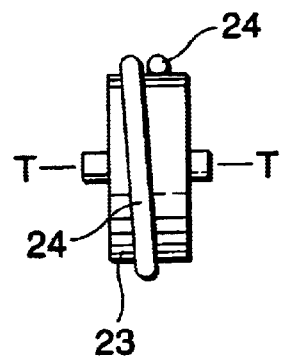

FIGS. 2(A), (B) and (C) are a plan, an elevational and a side view showing a case where an rotational directions thereof are identical. In FIG. 2, an axis S-S of an A roller 22 and an axis T-T of a B roller 23 are parallel to each other with the same rotational direction. In this case, the rotational directions are defined as being identical. Further, as a linear body 24 in this case is bent by the A roller 22 and B roller 23 in the same direction, its winding habit added by the A roller 22 is retained on the B roller 23. Moreover, even though the A roller 22 and B roller 23 revolve around the line axis X-X synchronously, the rotational directions are still identical.

Figure 3A:
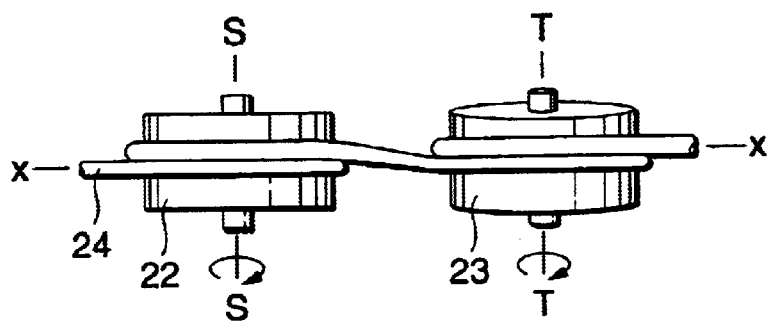
FIGS. 3(A), (B) and (C) are a plan, an elevational and a side view of rollers in another case where the rotational directions of rollers are identical.
Figure 3B:
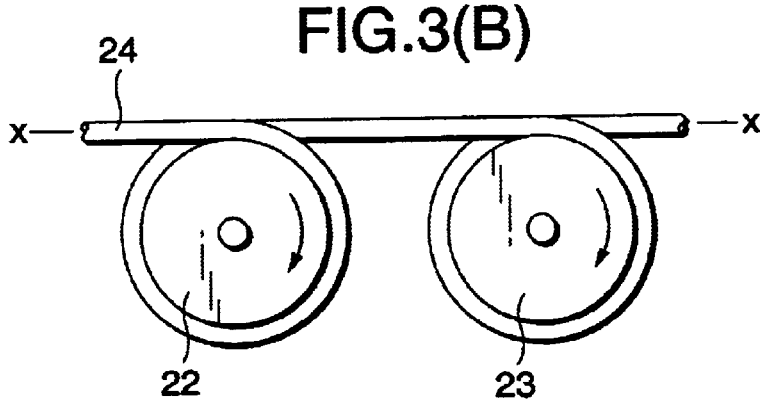
Figure 3C:
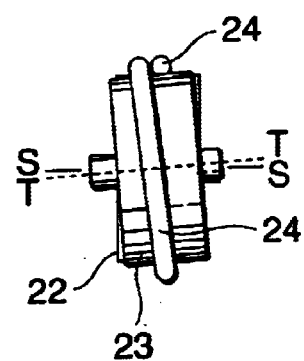

FIGS. 3(A), (B) and (C) are a plan, an elevational and a side view showing another example wherein the rotational directions are identical. In the case of FIG. 3, an axis T-T of the B roller 23 is slightly tilted relative to an axis S-S of the A roller 22, that is, not in parallel to the axis S-S of the A roller 22. Both their rotational directions are substantially identical. Even when the axis T-T of the B roller 23 is tilted by an angle of as relatively small as 30° or less relative to the axis S-S of the A roller 22 and both their rotational directions are identical, the winding habit given by the A roller 22 to the linear body 24 is substantially retained on the B roller 23 and no greater twisting is developed in the linear body 24. Accordingly, the tilting of the axis of rotation by that degree makes it possible to assume that the rotational directions are identical in the present invention. Further, in this case, even though the A roller 22 and B roller 23 revolve around the line axis X-X synchronously, the rotational directions are identical remains unchanged.

Figure 4A:
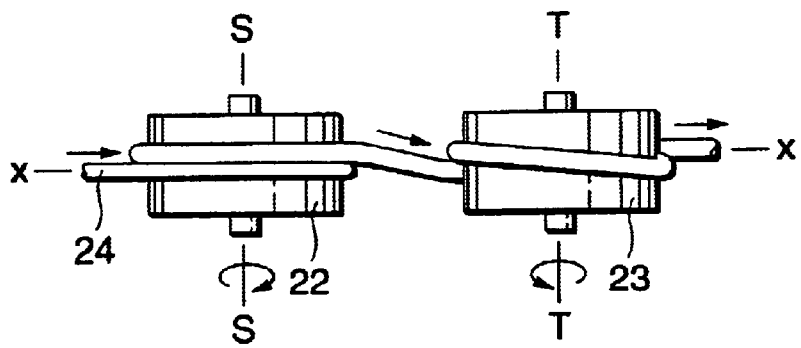
FIGS. 4(A), (B) and (C) are a plan, an elevational and a side view of rollers in a case where the rotational directions of rollers are opposite to each other.
Figure 4B:
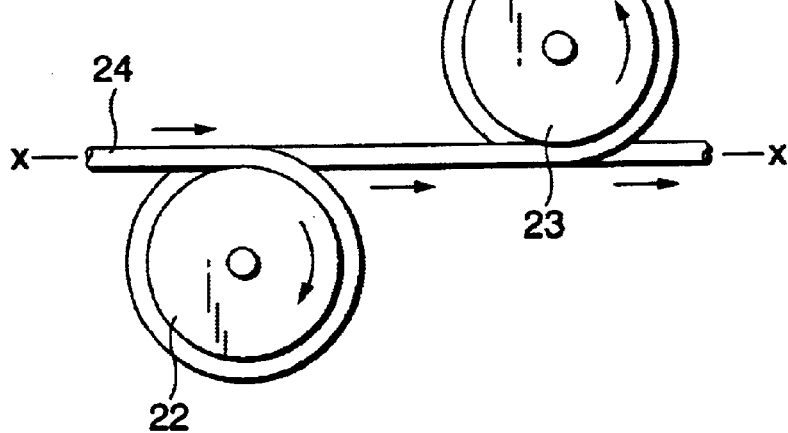
Figure 4C:
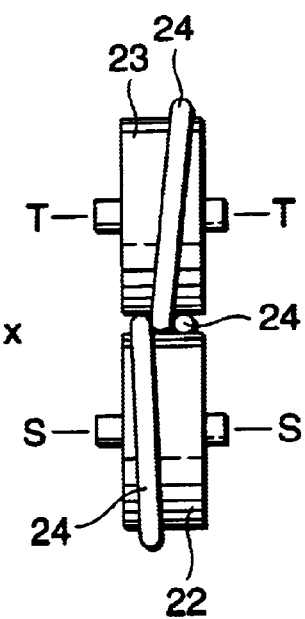

FIGS. 4(A), (B) and (C) are a plan, an elevational and a side view showing an example wherein the rotational directions are opposite to each other. In the case of FIG. 4, the directions of an axis S-S of the A roller 22 and an axis T-T of the B roller 23 are parallel to each other, and the rotational directions of them are opposite to each other. The rotational directions are also opposite to each other in this case. In the case of FIG. 4, bending force in a direction against the winding habit given by the A roller 22 to the linear body 24 is added to the linear body 24 on the B roller 23, and therefore the linear body 24 is subjected to twisting when it passes the B roller 23.

In the optical cable assembly apparatus of FIG. 1(A), the rotational directions of the supply reel 1 and the winding rollers 8 and 8' are set identical as shown in FIGS. 2 and 3 that have already been described. Moreover, the rotational directions of the dancer roller 3 and the dancer roller 4 in the spacer paying-out portion 7, and the capstan rollers 17, the dancer roller 18 and the taking-up reel 20 in the taking-up portion 21 are also identical to the rotational directions of the supply reel 1.

FIG. 5 is an elevational view of a main part of another embodiment of optical cable assembly apparatus of the present invention wherein elements similar to the elements of the optical cable assembly apparatus in FIG. 1 are given same reference numbers. The optical cable assembly apparatus of FIG. 5 is different from the optical cable assembly apparatus of FIG. 1(A) in the following points. Although the winding rollers 8 and 8' in FIG. 1 are respectively installed between the spacer paying-out portion 7 and the gathering portion 14, and between the gathering portion 14 and the taking-up portion 21, the winding rollers 8 and 8' in FIG. 5 are respectively installed inside the brake mechanism 6 and the take-up mechanism 19. With this arrangement further, the guide roller 5 installed in the brake mechanism 6 and the guide roller 16 installed in the take-up mechanism 19 in FIG. 1(A) are not used in FIG. 5.

In the optical cable assembly apparatus of FIG. 5, the incoming and outgoing wire directions of the winding rollers 8 and 8' coincide with the line axis X-X, and the winding rollers 8 and 8' also revolve around the line axis X-X in coincide with the respective revolutions of the brake mechanism 6 and the take-up mechanism 19 on the line axis X-X. Moreover, the rotational directions of the winding rollers 8 an 8' and the supply reel 1 are made identical, and the spacer 2 and the cable core 15 are wound on the respective winding rollers 8 and 8' more than once.

The specific shapes of the winding rollers 8 and 8' in the optical cable assembly apparatus of FIG. 5 are identical to those shown in FIGS. 1(B), (C) and (D). In the case of the optical cable assembly apparatus shown in FIG. 5, the spacer 2 is not bent in a direction against the winding habit of the spacer 2 because the rotational directions of all of the rollers and reels are identical. Accordingly, no bending in a direction against the winding habit, and therefore no twisting of the spacer 2 is produced thereby. Naturally, no variation in the stranding ratio of the optical fiber ribbon relative to the spacer which is generated by the twisting of the spacer occurs, and thereby no the deterioration of transmission characteristics of the optical fiber ribbon occurs.

Figure 6A:
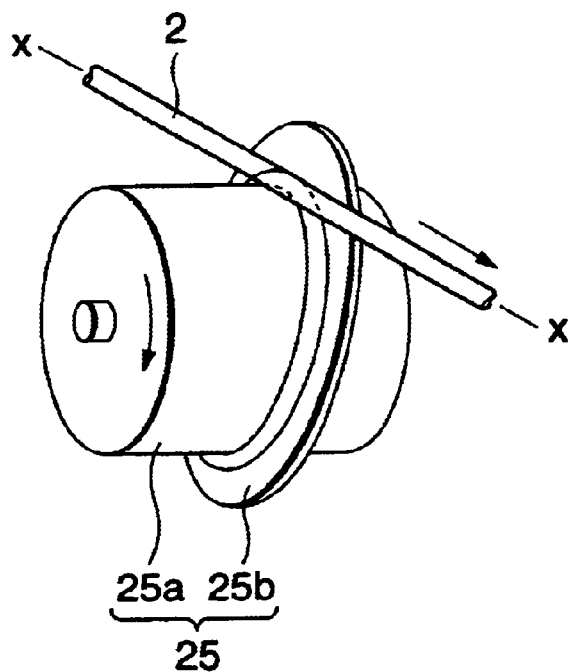
FIGS. 6(A), (B) and (C) are a perspective, an elevational and a side view of another example of a winding roller for use in the optical cable assembly apparatus according to the present invention.
Figure 6B:
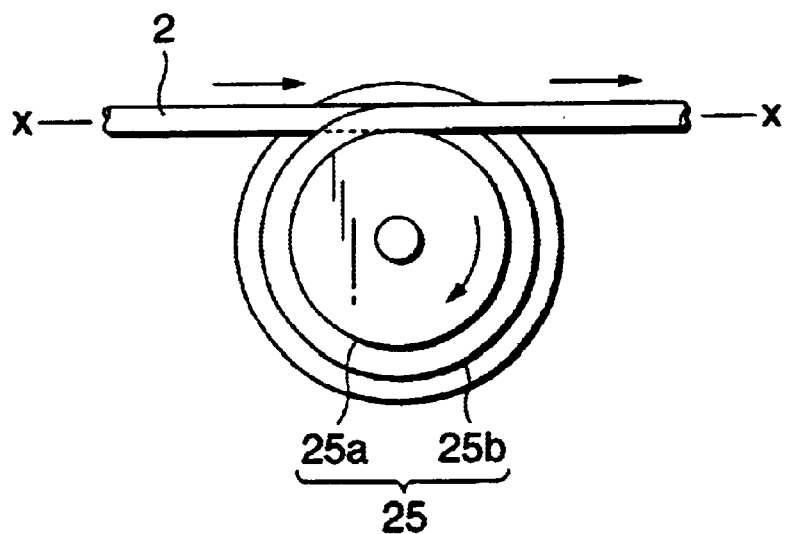
Figure 6C:
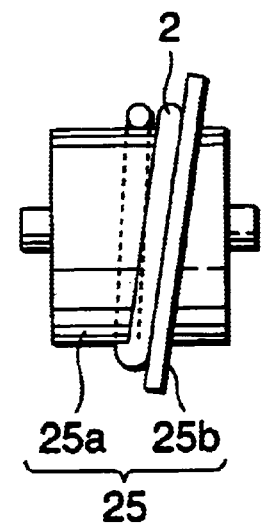
Figure 7A:
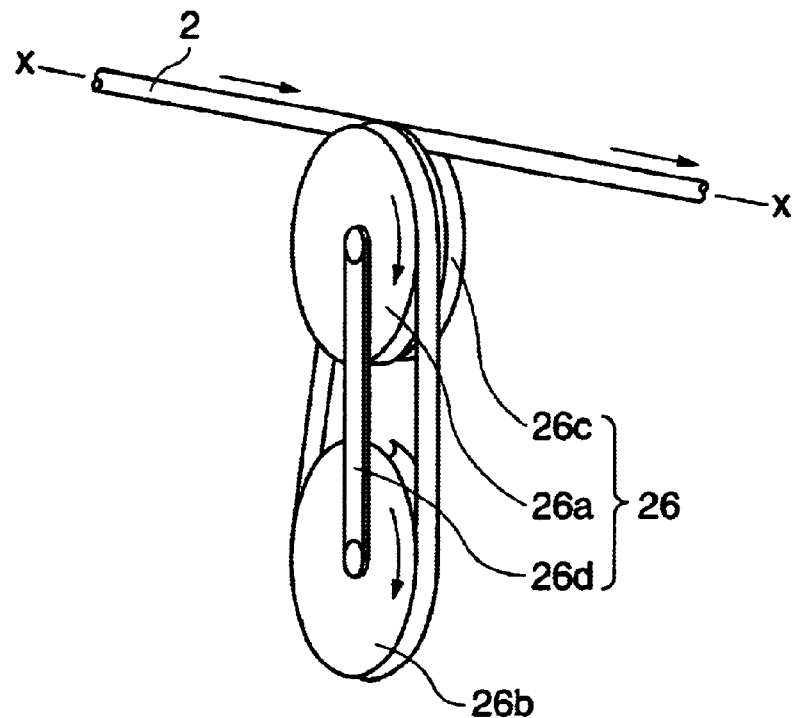
FIGS. 7(A), (B) and (C) are a perspective, an elevational and a side view of still another example of a winding roller for use in the optical cable assembly apparatus according to the present invention.
Figure 7B:
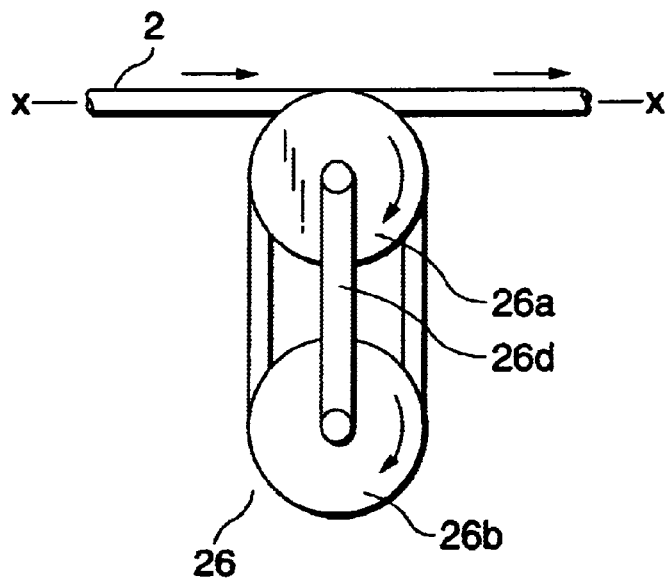
Figure 7C:
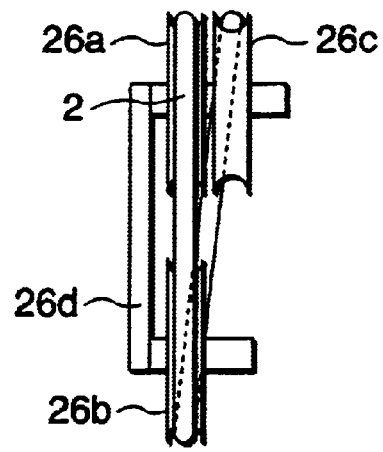

FIGS. 6 and 7 show other cases where winding rollers in stead of the winding roller 8 described in FIGS. 1(B), (C) and (D) above are usable. FIG. 6 shows an example of a winding roller having a fleeting ring, and FIG. 7 shows an example using a winding roller having a plurality of rollers. FIGS. 6(A), (B) and (C) are a perspective, an elevational and a side view showing a winding roller using such a fleeting ring and a spacer 2. In FIGS. 6(A), (B) and (C), a winding roller 25 comprises a roller surface 25a and a fleeting ring 25b.

The fleeting ring 25b is a ring that is rotatably fitted onto the roller surface 25a of the winding roller in a such a condition which it is tilted with respect to a direction vertical to a roller axis of the winding roller. The fleeting ring 25b makes the spacer 2 wound on the roller surface 25a slide on the roller surface 25a in the axial direction of the winding roller by pushing the spacer, so that the incoming and outgoing wire directions of the spacer synchronize with the line axis X-X. In the case of the winding roller 25, the winding roller 25 is also revolved around the line axis X-X in synchronization with that of the spacer paying-out portion while making the incoming and outgoing wire directions substantially coincide with the line axis X-X. The winding roller 25, as shown in FIG. 6(B), is rotated clockwise in the elevational view thereof, and the rotational direction of the winding roller 25 is made identical to that of the supply reel of the spacer 2.

Since the winding roller 25 has the fleeting ring 25b, it is capable of shifting the respective spacer positions on the outgoing wire side and the incoming wire side without holding the spacer with the side roller as in the case of the winding roller 8. Further, the incoming and outgoing wire directions of the spacer are stabilized so as not to both directions being same, that is the incoming and outgoing wires may not be overlapped to each other. The spacer is prevented from being damaged because the fleeting ring 25b pushes the spacer 2 with the surface thereof. Moreover, the winding roller 25 is made rotatable on the roller axis by moving forward the spacer wound on the roller surface 25a and therefore applies no rotational driving force to the roller shaft.

FIGS. 7(A), (B) and (C) are a perspective, an elevational and a side view showing a winding roller using a plurality of rollers. In FIGS. 7(A), (B) and (C), a winding roller 26 comprises a first roller 26a, a second roller 26b, a third roller 26c and a coupling member 26d. In the case of the winding roller 26, the first and third rollers 26a and 26c are set parallel to each other and coupled to the second roller 26b with the coupling member 26d, so that the spacer 2 is stretched and moved forward from the first roller 26a to the third roller 26c via the second roller 26b.

Then the winding roller 26 is revolved on line axis X-X in synchronization with and in the same direction of revolution of the spacer paying-out portion while making the incoming and outgoing wire directions coincide with the line axis X-X. The rotational directions of the rollers of the winding roller 26 are made identical to that of the supply reel, and the winding direction of the spacer 2 is such that as shown in the elevational view of FIG. 7(B), that is the spacer is wound on each of the rollers which rotate clockwise and moved clockwise on the rollers.

Each roller of the winding roller 26 is made rotatable on the roller axis by moving forward the spacer wound on the three roller surfaces and therefore applies no rotational driving force to each roller shaft. Further, the direction of the axis of the second roller 26b is slightly tilted with respect to the directions of roller axis of the first and third rollers 26a and 26c, so that the spacer 2 can smoothly run across them. Although the winding roller having a combination of three rollers has been shown in the example of FIG. 7, two rollers or more than three rollers in combination may be used to constitute the winding roller.

Figure 8:
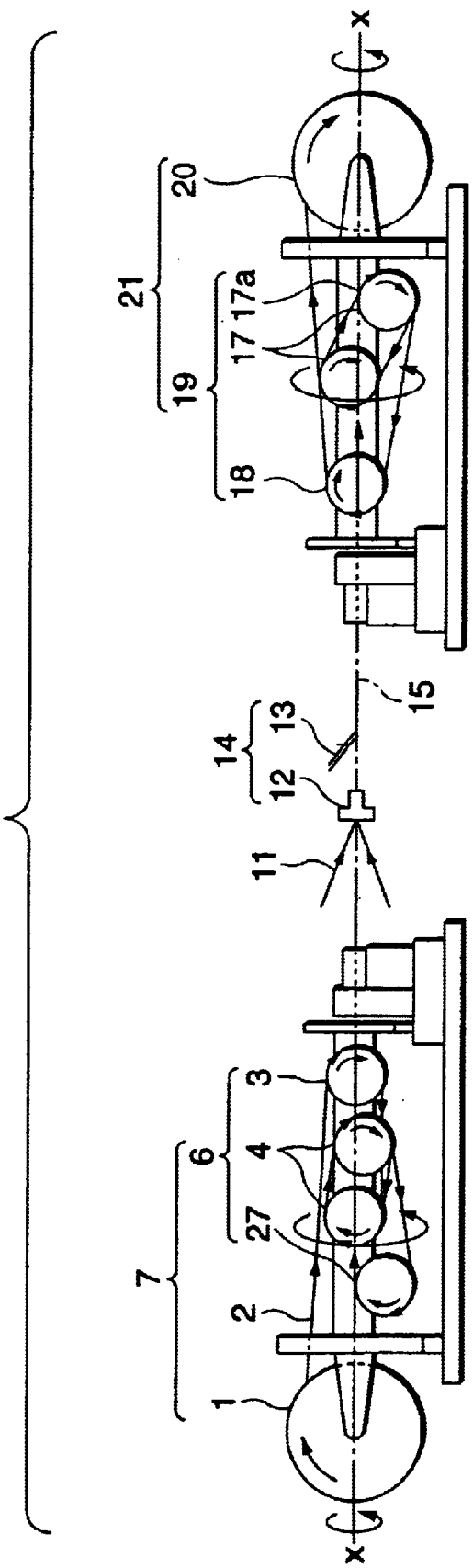
FIG. 8 is an elevational view of a main part of still another embodiment of optical cable assembly apparatus according to the present invention.
Figure 9A:
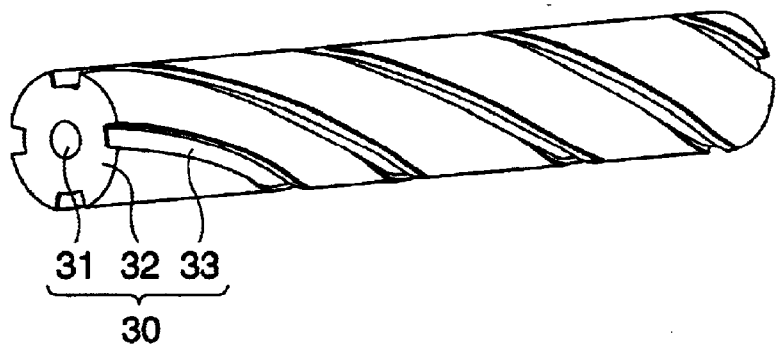
FIG. 9(A) is a perspective view of a spacer for use in an optical cable, FIG. 9 (B) is a transverse sectional view of optical fiber ribbons for use in an optical cable, and FIG. 9 (C) is a transverse sectional view of an example of an optical cable.
Figure 9B:
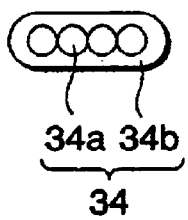
Figure 9C:
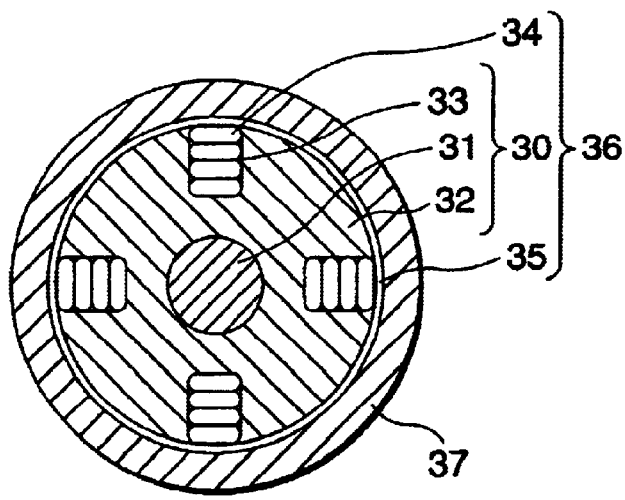

FIG. 8 is an elevational view of a main part of still another embodiment of an optical cable assembly apparatus of the present invention wherein elements similar to the elements of the optical cable assembly apparatus in FIG. 1 are given the same reference numbers. This optical cable assembly apparatus includes a first capstan roller 17a and a turnroller 27. The turnroller 27 is a roller for use in changing a direction of a spacer 2, and an outgoing wire direction of the turnroller 27 coincides with a line axis X-X. Moreover, an incoming wire direction of the first capstan roller 17a of a capstan roller 17 is made to coincide with the line axis X-X.

When a spacer paying-out portion 7 and a taking-up portion 21 are revolved around the line axis X-X, the spacer 2 sent out of the turnroller 27 moves forward while rotating on its center axis. Then the spacer 2 becomes the cable core 15 via the gathering portion 14 before entering the first capstan roller 17a. In the optical cable assembly apparatus of FIG. 8, as in the optical cable assembly apparatus shown in FIG. 5, the rotational directions of the dancer roller 3, the brake roller 4 and the turnroller 24 installed in the brake mechanism 6, and the rotational directions of the capstan roller 17, the dancer roller 18 and the taking-up reel 20 are also identical to that of the supply reel 1.

Accordingly, the spacer 2 is bend in the same direction as that of the winding habit given to the spacer 2 on the supply reel 1, so that no twisting can be caused to the spacer 2 by accepting. As the number of rollers in the optical cable assembly apparatus shown in FIG. 8 is smaller than that in the optical cable assembly apparatus shown in FIG. 5, the optical cable assembly apparatus shown in FIG. 8 can be produced less costly.

The optical cable assembly apparatus according to the present invention comprises the spacer paying-out portion revolving around the line axis, the stationary ribbon supply unit, the gathering portion, and the taking-up portion revolving around the line axis. The winding roller having an rotational direction identical to the rotational direction of the supply reel of the spacer is installed adjacently before and after the gathering portion. Further, the winding roller is revolved around the line axis in synchronization with the revolution of the spacer paying-out portion, and the spacer or the cable core is wound on the winding roller. Consequently, no bending is given to the spacer in a direction against the winding habit of the spacer in front of and behind the gathering portion, and therefore it is able to prevent the twisting of the spacer, to stabilize the length of optical fiber ribbons to be held within the spiral groove of the spacer and to prevent the transmission characteristics of the optical fiber ribbons from being deteriorated.

Further, provision of the winding roller in the spacer paying-out portion or the taking-up portion makes it possible to use the facilities for revolving the winding roller in common with those for revolving the spacer paying-out portion or the taking-up portion, thus resulting in reducing the facility cost. Moreover, the dancer roller or the capstan roller can serve as the winding roller without installing the winding roller by changing the outgoing wire position of the dancer roller or the incoming wire position of the capstan roller, so that the facility cost also becomes reducible.

The use of the rotary roller with the side roller as the winding roller or the rotary roller with the fleeting roller can suppress centrifugal force resulting from the revolution around the line axis in comparison with the use of the winding roller using the combination of plurality of rollers, and make it possible to reduce the facility cost due to the use of only one rotary. Moreover, the outgoing wire direction can be stabilized by preventing the incoming and outgoing wire directions of the spacer from being same direction on top of each other.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. An apparatus for assembling an optical cable along a line axis comprising:

a spacer paying-out portion, having a supply reel on which a grooved spacer having an elongated plastic rod with a plurality of spiral grooves in its circumferential surface is wound, for paying-out said spacer therefrom while revolving around a line axis;

a stationary supply unit for supplying a plurality of optical fiber ribbons to be inserted into the respective spiral grooves of said spacer;

a gathering portion for inserting and holding said optical fiber ribbons in the respective spiral grooves of the spacer running forward and rotating on its center axis to form a cable core;

a taking-up portion, having a taking-up reel on which said cable core is, for winding the cable core on the taking-up reel while revolving around the line axis;

a first winding roller rotating in a rotational direction identical to the rotational direction of the supply reel of the spacer, for winding said spacer, said first winding roller being disposed substantially and adjacently before said gathering portion in a spacer conveying direction; and a second winding roller rotating in a rotational direction identical to the rotational direction of the supply reel of the spacer, for winding said cable core, said second winding roller being disposed substantially and adjacently after said gathering portion in the spacer conveying direction;

wherein said first and second winding rollers are revolved around the line axis in synchronization with the revolution of the spacer paying-out portion, wherein said first winding roller is disposed in the vicinity of a place letting out said spacer in the spacer paying-out portion and said second winding roller is disposed in the vicinity of a place entering the cable core in the taking-up portion, and wherein each of said first and second winding roller comprises a rotary roller with a roller surface on which one of said spacer and said cable core is wound, said rotary roller having side roller for pushing the one along the roller surface in parallel with an axial direction of the rotary roller.

2. An apparatus for assembling an optical cable along a line axis comprising:

a spacer paying-out portion, having a supply reel on which a grooved spacer having an elongated plastic rod with a plurality of spiral grooves in its circumferential surface is wound, for paying-out said spacer therefrom while revolving around a line axis;

a stationary supply unit for supplying a plurality of optical fiber ribbons to be inserted into respective spiral grooves of said spacer;

a gathering portion for inserting and holding said optical fiber ribbons in the respective spiral grooves of the spacer running forward and rotating on its center axis to form a cable core;

a taking-up portion, having a taking-up reel on which said cable core is, for winding the cable core on the taking-up reel while revolving around the line axis;

a first winding roller rotating in a rotational direction identical to the rotational direction of the supply reel of the spacer, for winding said spacer, said first winding roller being disposed substantially and adjacently before said gathering portion in a spacer conveying direction; and a second winding roller rotating in a rotational direction identical to the rotational direction of the supply reel of the spacer, for winding said cable core, said second winding roller being disposed substantially and adjacently after said gathering portion in the spacer conveying direction, wherein said first and second winding rollers are revolved around the line axis in synchronization with the revolution of the spacer paying-out portion, wherein said first winding roller is disposed between the spacer paying-out portion and the gathering portion and said second winding roller is disposed between the gathering portion and the taking-up portion, and wherein each of said first and second winding roller comprises a rotary roller with a roller surface on which one of said spacer and said cable core is wound, said rotary roller having a side roller for pushing the one along the roller surface in parallel with an axial direction of the rotary roller.

3. An apparatus for assembling an optical cable along a line axis comprising:

a spacer paying-out portion, having a supply reel on which a grooved spacer having an elongated plastic rod with a plurality of spiral grooves in its circumferential surface is wound, for paying-out said spacer therefrom while revolving around a line axis;

a stationary supply unit for supplying a plurality of optical fiber ribbons to be inserted into respective spiral grooves of said spacer;

a gathering portion for inserting and holding said optical fiber ribbons in the respective spiral grooves of the spacer running forward and rotating on its center axis to form a cable core;

a taking-up portion, having a taking-up reel on which said cable core is, for winding the cable core on the taking-up reel while revolving around the line axis;

a first winding roller rotating in a rotational direction identical to the rotational direction of the supply reel of the spacer, for winding said spacer, said first winding roller being disposed substantially and adjacently before said gathering portion in a spacer conveying direction; and a second winding roller rotating in a rotational direction identical to the rotational direction of the supply reel of the spacer, for winding said cable core, said second winding roller being disposed substantially and adjacently after said gathering portion in the spacer conveying direction, wherein said first and second winding rollers are revolved around the line axis in synchronization with the revolution of the spacer paying-out portion, wherein said first winding roller is disposed in the vicinity of a place letting out said spacer in the spacer paying-portion and said second winding roller is disposed in the vicinity of a place entering the cable core in the taking-up portion, and wherein each of said first and second winding rollers comprises a rotary roller with a fleeting ring which is rotatably fitted onto a roller surface of the rotary roller.

4. An apparatus for assembling an optical cable along a line axis comprising:

a spacer paying-out portion, having a supply reel on which a grooved spacer having an elongated plastic rod with a plurality of spiral grooves in its circumferential surface is wound, for paying-out said spacer therefrom while revolving around a line axis;

a stationary supply unit for supplying a plurality of optical fiber ribbons to be inserted into respective spiral grooves of said spacer;

a gathering portion for inserting and holding said optical fiber ribbons in the respective spiral grooves of the spacer running forward and rotating on its center axis to form a cable core;

a taking-up portion, having a taking-up reel on which said cable core is, for winding the cable core on the taking-up reel while revolving around the line axis;

a first winding roller rotating in a rotational direction identical to the rotational direction of the supply reel of the spacer, for winding said spacer, said first winding roller being disposed substantially and adjacently before said gathering portion in a spacer conveying direction; and a second winding roller rotating in a rotational direction identical to the rotational direction of the supply reel of the spacer, for winding said cable core, said second winding roller being disposed substantially and adjacently after said gathering portion in the spacer conveying direction, wherein said first and second winding rollers are revolved around the line axis in synchronization with the revolution of the spacer paying-out portion, wherein said first winding roller is disposed between the spacer paying-out portion and the gathering portion and said second winding roller is disposed between the gathering portion and the taking-up portion, and wherein each of said first and second winding rollers comprises a rotary roller with a fleeting ring which is rotatably fitted onto a roller surface of the rotary roller.

* * * * *